May 30, 1972  YU KUN PEI  3,666,583
METHOD FOR MAKING AND ASSEMBLING SEALED TUBULAR BODIES
Filed April 22 1970  4 Sheets-Sheet 4
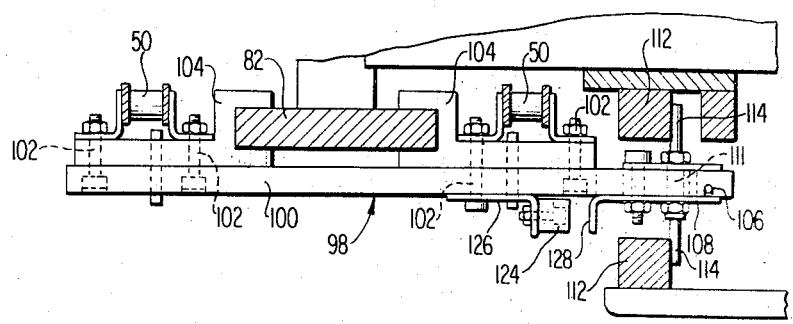
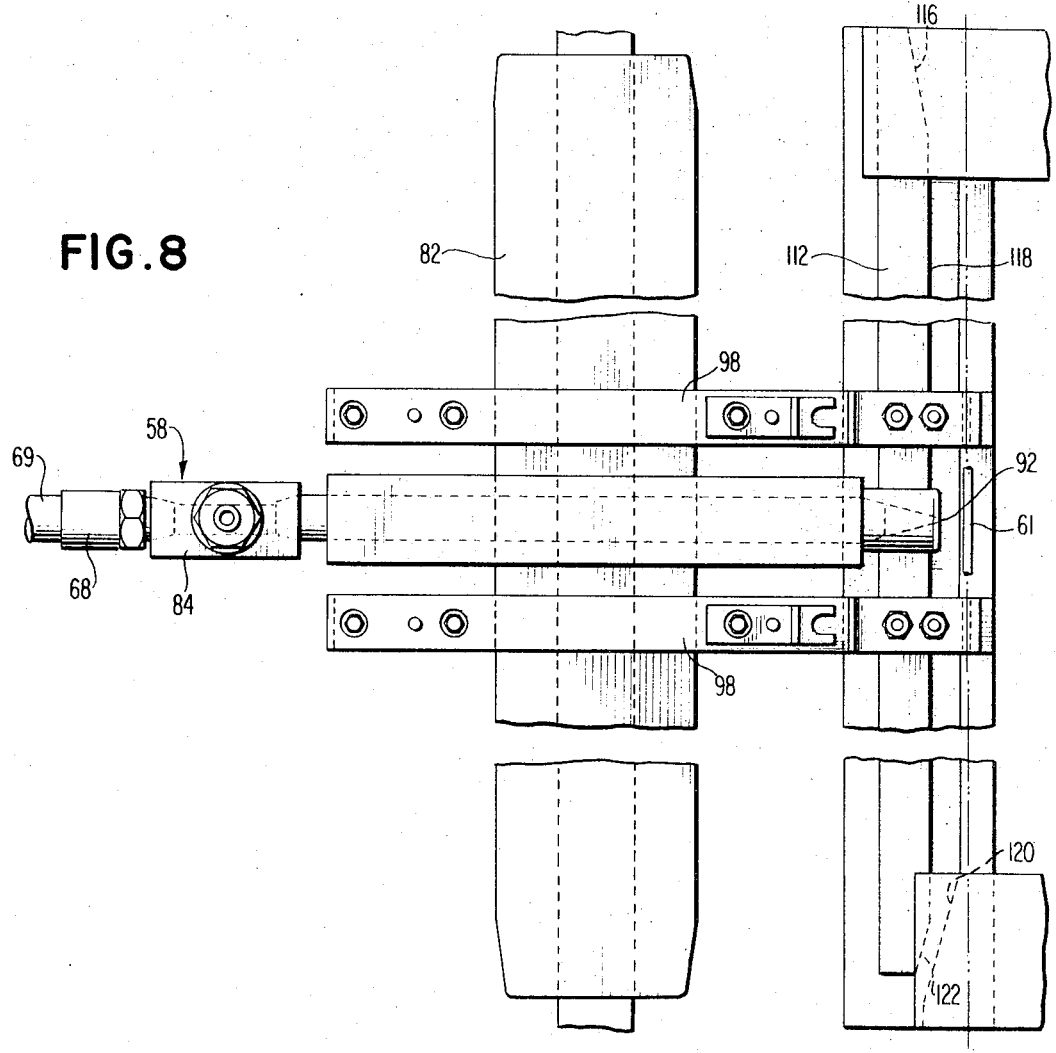
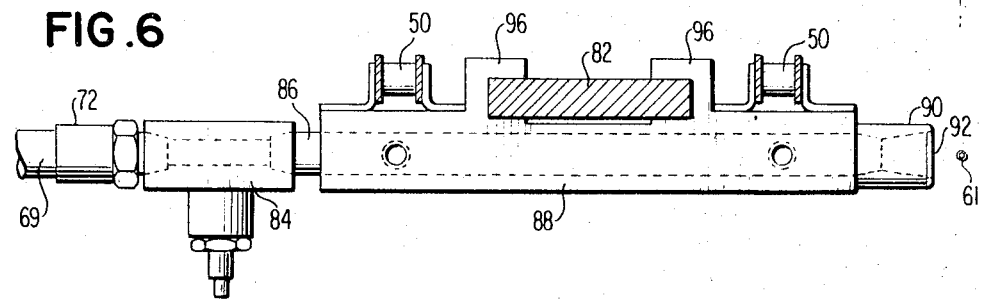

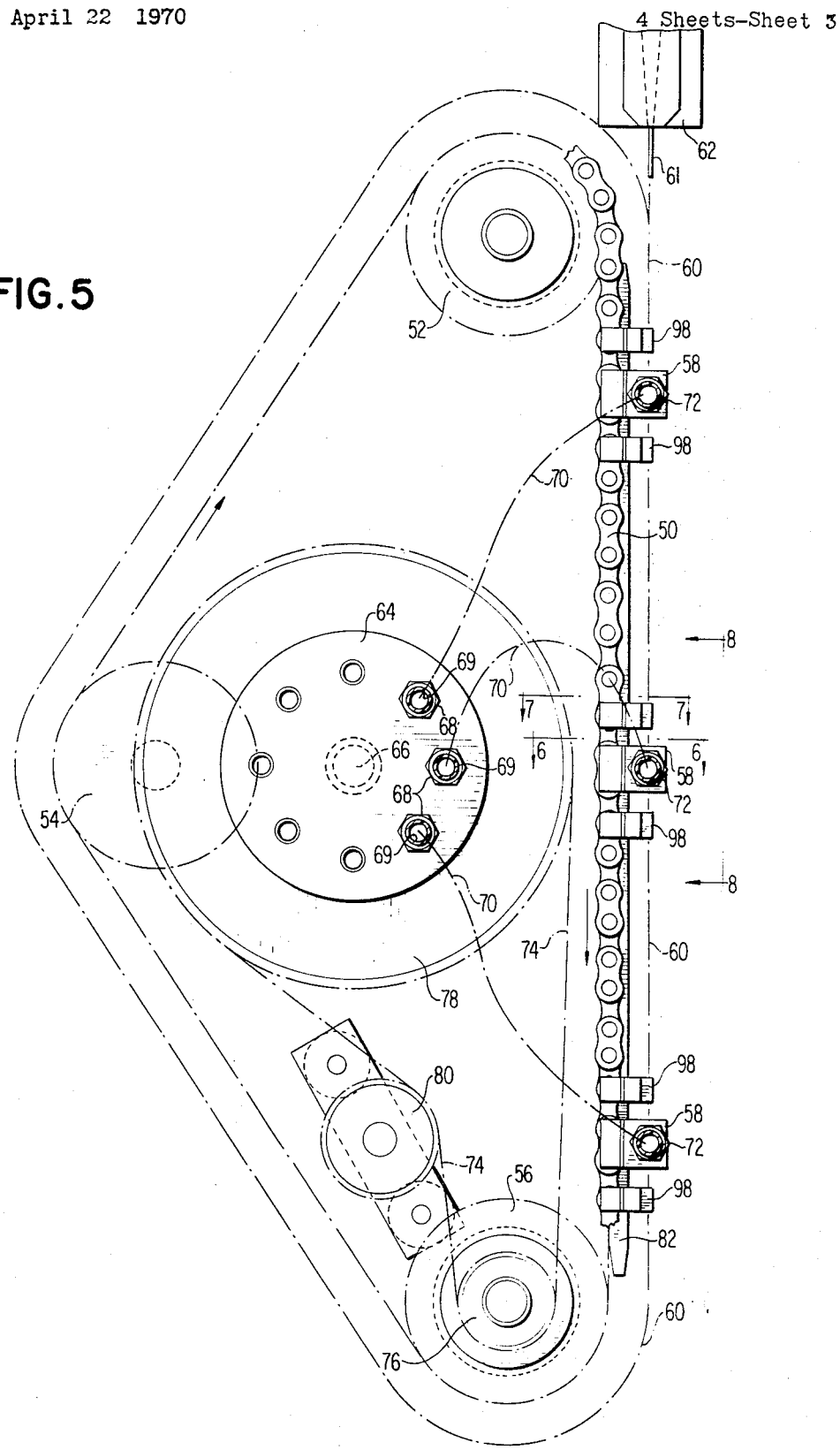

United States Patent Office 3,666,583
Patented May 30, 1972

3,666,583
METHOD FOR MAKING AND ASSEMBLING SEALED TUBULAR BODIES
Yu Kun Pei and Frank Veres, Toledo, Ohio, assignors to Owens-Illinois, Inc.
Filed Apr. 22, 1970, Ser. No. 30,855
Int. Cl. B29c 25/00
U.S. Cl. 156—82    15 Claims

ABSTRACT OF THE DISCLOSURE

Sealed sections of thermoplastic tubing, such as glass tubing, are formed by directing a cutting flame against a continuously moving length of tubing. The flame-emitting burner and the tubing move along parallel paths and at the same velocity.

A continuous length of tubing is cooled before being divided into individual sealed sections, so that the internal pressure within the sealed sections will be sufficient to cause the walls of the sections to expand when subjected to temperatures at which they are thermoplastic. Tubing sections so produced are suited for use in a process wherein they are arranged in parallelism, laterally confined and heated above their softening temperature so that their walls expand into mutual conformity to form a honey-comb-like structure.

---

This invention relates to methods and apparatus for making a plurality of sealed tubular sections and for uniting a plurality of such sealed tubular sections which are arranged in parallelism. The invention is useful in the manufacture of regenerators for gas turbine engines and for other purposes.

Gas turbine regenerators may be made from a plurality of small tubes, i.e. tubes having an internal diameter of 0.1 inch or less. A parallel group of tubes which are sealed at their opposite ends are united by confining them laterally and then raising their temperature until the materials entrapped within each tube expand to force its walls against those of the next adjacent tube. In the case of thermally crystallizable glasses, the assembled tubes are heated to thermally crystallize them to glass-ceramics, essentially simultaneously with the sealing operation.

Novel aspects of this invention relate to the manner in which the sealed tubular sections are formed and assembled. The sealed tubular sections are made by severing and sealing spaced apart localized zones of a moving length of tubing. The sealed sections of tubing enclose a sufficient quantity of air or other material to generate the essential internal pressure upon reheating.

This invention is directed in part to a particular manner of sealing and severing sections of tubing from an elongated length thereof which preferably extends continuously from a hot tube forming zone. The severing and sealing involves the subjection of the tube to tensile forces during cutting and sealing. A vertical orientation of the tubing will gravitationally produce such tensile forces. Severing and sealing is accomplished by directing the flame of a cutting burner against the moving length of tubing, and advancing the tubing and the burner concurrently until the combined action of the burner and the tensile forces will result in the severing and sealing.

Other aspects of the invention pertain to the methods of ensuring that the sealed sections of tubing contain gases or other expansible materials in sufficient quantities to permit subsequent expansion of the sections when they are reheated to a temperature at which they become thermoplastic. This is important in the manufacture of a body from a group comprising many of the sealed tubular sections by a process wherein the group is first confined laterally and then heated to a temperature at which the glass will soften sufficiently that the entrapped material will expand the thermoplastic tubes, and force the walls of adjacent tubular sections into mutual conformity. When the tubing is formed of a thermally crystallizable glass material, the entrapped expansible material should be capable of generating pressures of at least 45 p.s.i.a. at temperatures no greater than 1,500° F.

One method of providing adequate amounts of expansible materials within the sealed tubing sections is to fill the tubing with material as it is drawn from a hot forming zone where it is made by any suitable process, for example by reheating and attenuating a tubular body or by drawing it around a hollow mandrel from a hot molten mass. The hot tubing so formed may be artificially cooled, thus reducing its internal pressures and drawing air inwardly through the mandrel. Alternatively, a condensible vapor may be injected into a hot-formed tube. In this case, the vapor condenses at a temperature above atmospheric temperature into a solid or liquid prior to the severing and sealing step. The condensed vapor may be expanded by vaporization upon reheating of the tubing. Another approach involves the cooling of the tubing which has been severed from the hot-forming apparatus before it is sealed and severed to form the individual sections.

In FIG. 4, the laterally confined group of sealed tubular sections is located in a furnace where their temperature is raised sufficiently to soften them to a thermoplastic condition.

FIG. 5 is an elevational view of the apparatus for holding, severing and sealing the tubing;

FIG. 6 is a view along the line 6—6 in FIG. 5, showing a cutting burner unit and its associated supporting means;

FIG. 7 is a view along the line 7—7 in FIG. 5, showing one of the movable guide members which holds the tubing during the severing and sealing step;

FIG. 8 is an elevational view taken along the line 8—8 in FIG. 5, showing both a cutting burner unit and a tube-holding guide member together with their supporting and operating means.

Figures 1, 4:
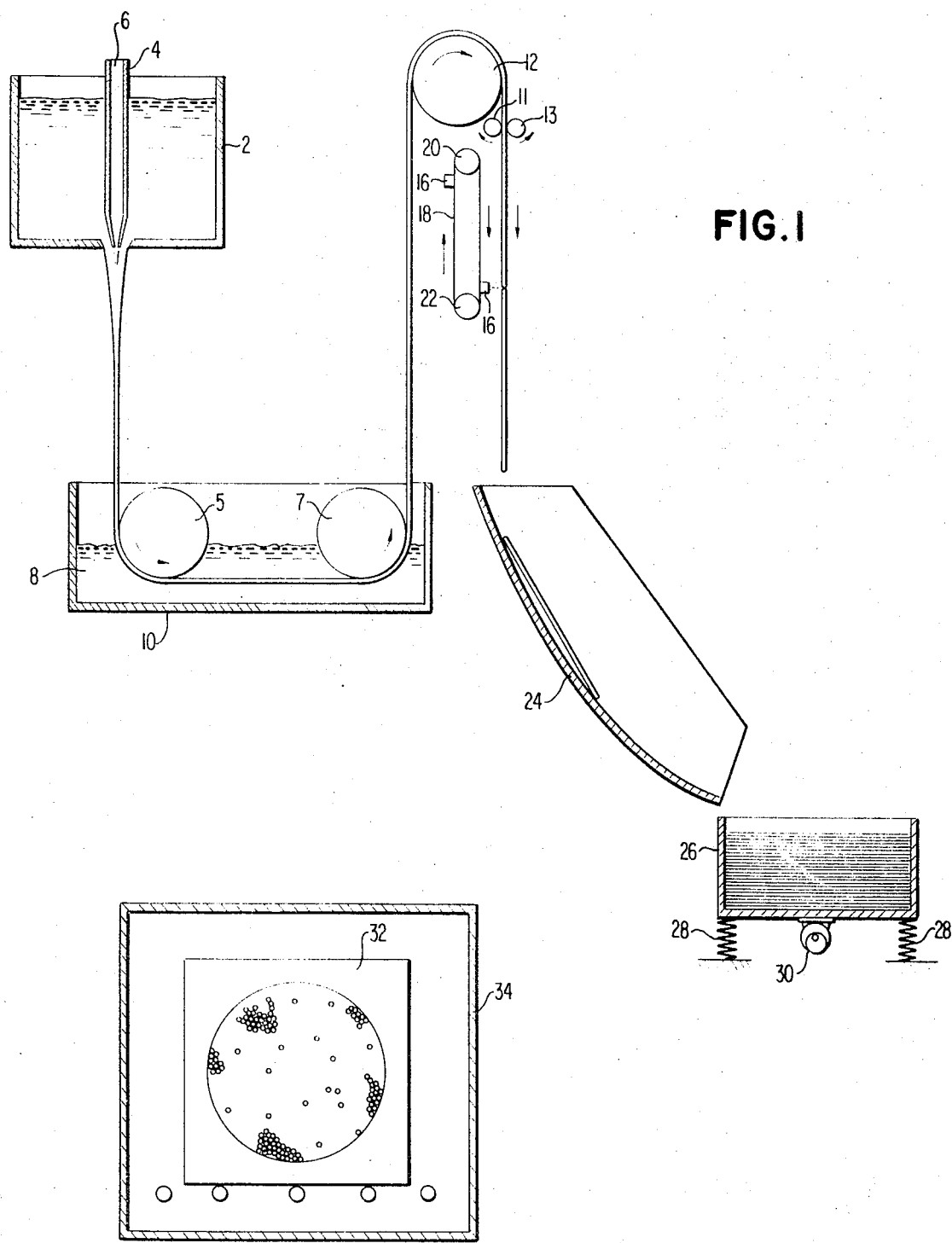
FIG. 1 shows in diagrammatic form an apparatus for producing sealed sections of thermoplastic tubing, and assembling a group of the sealed sections in parallelism. In this apparatus the tubing is cooled by immersion after being drawn from a hot molten body, thereby reducing the internal pressure of the tubing and drawing air inwardly through the tubing in the hot forming zone.
FIG. 4 illustrates diagrammatically the assembly and lateral confinement of a plurality of sealed tubular sections formed by the apparatus shown in FIGS. 1–3.

As mentioned previously, this invention involves a number of interrelated matters useful in the manufacture of unitary bodies from a plurality of sealed tubular sections of thermoplastic material. The methods and apparatus disclosed herein can be employed for the manufacture of glass-ceramic regenerators for gas turbine engines, but also find utility in manufacturing other products, such as a nozzle for a Fisher burner, or heat and sound insulation material.

One technique used for uniting a plurality of sealed thermoplastic tubular sections is to assemble them in parallelism, confine them laterally, and expose them to high temperatures which softens their walls and heats the heat expansible fluid material entrapped within the tubular sections. As the temperature is raised, if the internal pressure within the tubular sections is sufficient, the walls of the thermoplastic tubing will be expanded until the walls of adjacent tubular sections are fused together. When starting with thermally crystallizable glass tubing, heating is continued for a time sufficient to change the glass into its crystalline or glass-ceramic state.

Experience has shown that high speed fabrication of sealed tubular sections according to usual techniques results in the presence of a partial vacuum within each of the tubular sections. When efforts are made to form a unitary body from these sections by subjecting them to heat while laterally confining them, it has been found that the entrapped gases are often not sufficient to generate the desired pressure. This specification discloses three suitable methods whereby the objectionable partial vacuum within the sealed tubular sections may be avoided by cooling a continuous length of hot-formed tubing before subjecting it to the severing and sealing steps, or by filling it with a condensible material which condenses before sealing and later will vaporize during the firing operation. Either of these procedures produces an area of reduced pressure within the tubing, thus drawing additional air into the tube in the direction of its formation. Lengths of tubing may also be cooled in storage between their hot formation and the severing and sealing step.

Another aspect of the invention involves a highly efficient method and apparatus for sealing and severing a continuous length of tubing which is moving at a high speed, preferably from a hot-forming apparatus. The severing and sealing operation is performed by flame severing burners which are directed against, and are movable concurrently with, the tubing. According to this phase of the invention, the mass of the portion of the tubing which is being severed provides the attenuating tensile forces which assist in the severing and sealing operation. These tensile forces may be produced by moving the tubing along a path where it will be attracted longitudinally by gravity, so that the tensile forces will vary incrementally according to the distance from the leading free end of the tubing. Accordingly, the localized zone heated by the severing burner must be a sufficient distance from the free end of the tubing to provide tensile forces of a suitable magnitude.

FIG. 1 shows the formation of a continuous length of tubing by drawing glass downwardly through an annular opening located in a lower wall of a heated vessel 2 of a glass furnace. The center of the annular opening is defined by a mandrel 4 which has a longitudinal passage 6 communicating at one end with the atmosphere and at the other end with the interior of the formed glass tubing.

After the drawn tubing becomes dimensionally stable, but still retains a significant amount of heat, it passes over rolls 5 and 7 which immerse it in a liquid bath 8 within the tank 10. The relatively small size and thin walls of the tubing permit its movement around the arcuate periphery of the rolls 5 and 7, even after the temperature of the tubing has passed below the annealing point of the glass. This bath which may be ice water significantly reduces the temperature of the tubing and the enclosed gases, thus creating a partial vacuum which induces the unidirectional flow of additional air through the passage 6 of the mandrel 4 into the tubing.

After being artificially cooled by the bath 8, the tubing is passed upwardly and across a roller 12, between the positively driven draw rollers 11 and 13 which provide the attenuating force for the formation of the tubing and to a sealing and a severing apparatus. The continuously advancing tubing is heated at a localized zone by razor thin flames from the burners 16. The burners are supported on an endless chain 18 which passes over the rolls 20 and 22. Suitable manifold connections may be used to supply a continuous stream of fuel to the burners 16 as they move through their continuous path. A more specific description of the burner construction is found in FIGS. 5–8. The downwardly moving leg of the chain 18 runs parallel to the adjacent tubing, and is moved at a velocity equal to that of the tubing so that the same localized zone of the tubing is heated during the movement of the burner.

The satisfactory operation of flame severing and sealing apparatus of this type requires that the tubing be subjected to tensile forces. According to the preferred embodiment of the invention, these tensile forces are created by vertically orienting the portion of the tubing which is being severed and sealed, so that gravitational attraction of the tubing creates the tensile forces. These tensile forces vary directly in proportion to the distance from the free end of the tubing. It has been found that if the severed section is too short, the tensile forces are insufficient to provide satisfactory severing and sealing. Of course, the suitable length of the tubing beneath the localized zone will vary with the nature of the thermoplastic material, the wall thickness of the tubing and its diameter. The required length may be determined experimentally.

Once severed, the sealed section of tubing falls into a collector or onto a conveyor of any suitable type. As illustrated in FIG. 1, the sealed section falls on a chute 24, the interior wall of which may be lined with a material having a low co-efficient of friction such as the polytetrafluoroethylene distributed widely under the trademark Teflon. The lower end of chute 24 discharges into a container 26 where a plurality of the sealed sections are shown in parallel stacked relationship. The container 26 is resiliently supported on springs 28 and is continuously agitated by a vibrator 30 in order to minimize the air spaces between the individual sealed sections.

After a sufficient number of sealed sections have been collected in the container 26, they may be transferred into a rigid support such as the one shown at 32 in FIG. 4. This support has a circular opening, into which a maximum number of parallel sealed sections are inserted, so that they are laterally confined by the member 32. Then, the member 32 and the laterally confined sealed section are placed within a furnace diagrammatically illustrated at 34 in FIG. 4 and heated to an elevated temperature. The elevated temperature will vary significantly with the nature of the thermoplastic material used for forming the tubes, but, in any event, the temperature must be sufficient to soften the thermoplastic material and must be sufficiently high to generate internal pressures within each of the sealed sections to force the walls of the adjacent section into mutual conformity. Ideally, this mutual conformity will result in each of the tubular sections assuming a hexagonal cross section, with essentially no air space between adjacent sections. The entire assembly is cooled when so deformed. It has been found that the manufacture of regenerators of gas turbine engines with sealed tubular sections of thermally crystallizable glass material requires an internal pressure of at least 45 p.s.i.a. at temperatures not exceeding 1500° F. At these elevated temperatures, the glass will crystallize to form the refractory material suitable for use in a gas turbine regenerator.

Figure 2:
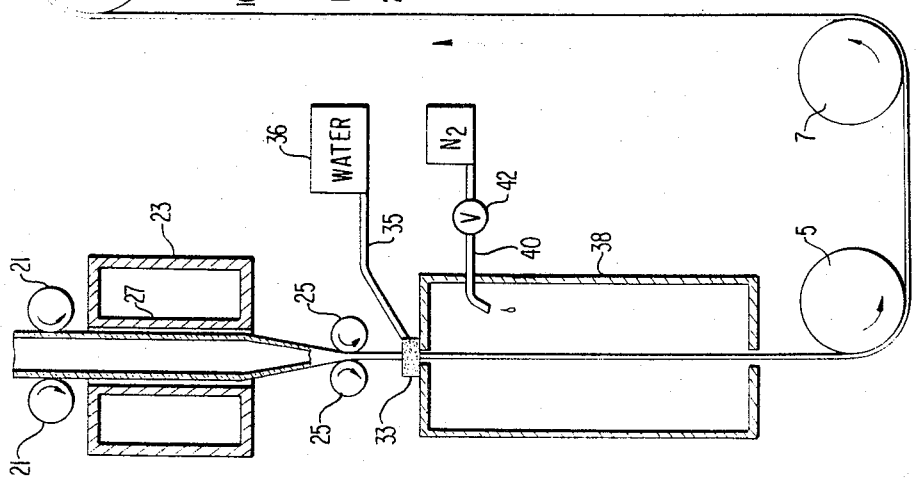
FIG. 2 shows an alternative form of the invention wherein the tubing is cooled after its formation by passing it through a chamber filled with cold gases.

The embodiment of FIG. 2 operates in generally the same manner as that of FIG. 1, by artificially cooling the tubing after its formation in order to create a partial vacuum therewithin and draw additional air inwardly in the direction of the draw. The tubing in this embodiment is hot formed from a larger tube by a redrawing operation. Feed rollers 21 advance the large stock tubing through a reheating zone where it is heated within a furnace 23 which includes a ceramic muffle 27 surrounding the tubing to shield it from the burner flames. The tubing is heated by radiation from the muffle 27. Drawing rolls 25 have a greater peripheral velocity than the feed rollers 21, and thereby attenuate the tubing to produce a suitable diameter and wall thickness. Referring to FIG. 2, it will be noted that after the tube is formed, it is moistened by a fountain sponge 33 which receives water through a pipe 35 from a source 36. Vaporization of the water applied by the sponge 33 permits some cooling of the tubing. After being moistened, the tubing passes through an elongated chamber 38 which encloses a cold gas. The gas may be expanded vapors of a cryogenic material such as liquid nitrogen which is fed to the chamber 38 through a conduit 40. A valve 42 controls the rate of flow of the refrigerant.

This cooling operation reduces the internal pressure within the tubing and induces an inward flow of air which is in the same direction but at a greater velocity than the movement of the tubing.

Once cooled, the tubing in the FIG. 2 embodiment is handled identically to that shown and described in connection with FIG. 1.

Figure 3:
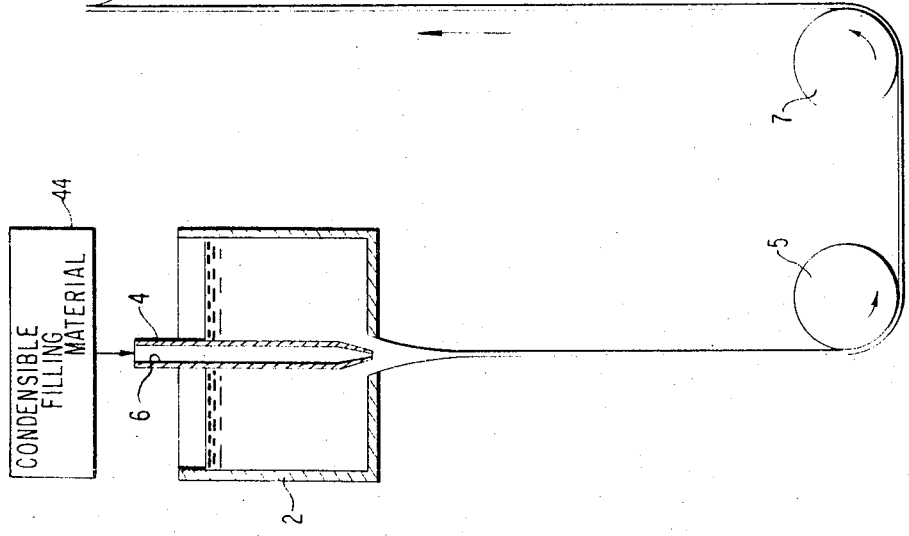
FIG. 3 illustrates a version of the invention wherein the tubing is filled with a condensible filling material during its formation and prior to its subjection to a severing and sealing step.

In the version of the invention shown in FIG. 3, the interior of the formed tubing is filled with a condensible material in addition to or in lieu of ambient air. The high temperatures required when tubes are formed from a glass-ceramic material make it essential that the condensible filling material be inorganic to avoid its decomposition. This filling material may be injected from a source 44 through the passage 6b in the mandrel 4b. At the hot-forming temperature, the condensible filling material will exist in its vapor or gaseous state.

The condensible filling material is selected so that it will condense into a liquid or solid at a temperature which is between the temperature of the tubing emerging from the hot forming section and the temperature of the tubing being subjected to the sealing and severing step. This results in the condensation of the filling material at a relatively high temperature preferably above 300° F., thereby creating a partial vacuum which draws additional condensible filling material and/or air inwardly into the formed section of tubing. Then, when the individual sections are severed and sealed, they will enclose the condensed filling material which is capable of expanding when subjected to the reheating operation shown in FIG. 4.

Some of the details of construction of the severing and sealing apparatus are shown in FIGS. 5–8 where it will be seen that the Caterpillar track designated 18 in FIGS. 1–4 may comprise a pair of endless chains 50 which travel in a triangular path about sets of three sprockets 52, 54 and 56. Only one chain and one set of sprockets may be seen in FIG. 5. Burner assemblies 58 are attached at uniformly spaced locations along the length of the chains 50, for movement therewith. Of course, the burners are located so that the thin, flat flame emitted thereby will be directed against the glass tubing 61 which follows the vertical line 60 after passing through the stationary guide member 62.

In order to prevent deflection of the tubing when it is struck by the flame from the burner assemblies 58, there are a plurality of guide assemblies 98 supported on the chains 50 for concurrent movement with the tubing 61 and the burners 58.

Combustion gases are furnished to the burners from a rotary coupling 64 which distributes gases from an axial passage 66 into a circular array of swivel connectors 68. Flexible conduits 69 are attached to each of the connectors 68 and lead along the paths shown by broken lines 70 to swivel connectors 72 on the individual burner assemblies. The flexibility and length of the conduits 69 permits them to accommodate the changes in distance between the rotary coupling 64 and the individual burner assembly 58.

The rotary coupling 64 is positively driven and coordinated with the velocity of the chains 50 so that the coupling 64 will make one rotation during the time interval a burner 58 moves entirely along the path of the chain 50. This coordination is accomplished by providing a secondary chain or belt 74 which rides on a relatively small sprocket 76. The sprocket 76 rotates at an angular velocity equal to that of sprocket 56, and it drives a large sprocket 78 which is attached for rotation with the rotary coupling 64. The diameters of the sprockets 76 and 78 are selected to provide the desired velocity ratios. An adjustably-positioned idler sprocket 80 is used to vary the tension of the chain 74.

In order to insure that the tubing moves at a velocity equal to that of the chains 50 and their attached burner assemblies 58, the draw rolls which are designated 11 and 13 in FIG. 1 may be driven through a chain by a sprocket (not shown) which is coaxial with and attached to the sprocket 52.

Since the chains 50 are flexible, it is desirable to provide some form of stationary guide surface for the burner assemblies 58 as they move through the vertical path parallel to the tubing 61. Such a guide is shown in FIGS. 5–8 at 82.

The details of an individual burner assembly 58 may be seen in FIGS. 6 and 8. As explained previously, the combustible mixture for the burner enters the assembly through a flexible conduit 69 and a rotary coupling 68. It then passes through a regulator device 84 into a length of tubing 86 which passes through the support member 88. At the outlet end of the tubing 86 there is the burner head 90 which has outlet orifices 92 oriented to direct a thin sheet of flames against and perpendicular to the tubing 61.

The burner support 88 includes a pair of inwardly turned angular portions 96 which are adapted to engage the vertical guide member 82. Therefore, as the burner assembly is moved by the chains 50, the burner support member 88 will be engaged with the stationary trackway 82 in order to stabilize the positioning of the burner assembly.

As discussed above, it is desirable to hold the tubing during the impingement of the burner flames thereagainst, in order to prevent deflection of the tubing. This holding function is performed by the guide members 98, four of which may be provided between each pair of burners. These guide members are also movable concurrently with the tubing, preferably but not essentially due to their support on the chains 50.

The details of the individual guide members are best seen in FIGS. 7 and 8. Each guide member includes a base plate 100 which is attached by means of bolts 102 to brackets 104 and to the chain 50. Slots in the brackets 104 are adapted to accommodate the stationary guide member 82 to stabilize the guide assemblies during their vertical movement.

The tubing 61 is loosely held with a passage formed by a small slot 106 in a base plate 100 of the guide member 98. A sliding gate member 108 is movable horizontally to open and close the slot 106.

The gate 108 is attached to the base plate 100 by means of bolts 110 and 111 which pass through an elongated slot in the base plate 100. The dimensions of the elongated slot permit the horizontal sliding action of the gate 108.

Movement of the gate 108 is initiated principally by a pair of cams 112 which are located in the path of the cam follower extensions 114 of the bolt 111. The cams 112 are arranged to close the sliding gate 108 after the tubing has been guided into the slot 106 by the guide member 62 shown in FIG. 5. This closing action is performed by the inclined surface 116 which is shown in FIG. 8. During the movement of the cam followers 114 along the flat surface 118 of the cam, the gate will remain closed as shown in FIG. 7.

Toward the end of the downward movement of the guide member, the cam followers 114 strike an inclined surface 120 as they pass through a narrow passage 122. The surface 120 shifts the sliding gate 108 to the left as viewed in FIGS. 7 and 8, thereby opening the slot 106.

The gate is retained in its open position by a magnet 124 which is held on the base plate 100 by a bracket 126. This magnet 124 magnetically attracts an upwardly turned flange 128 on gate 108, thereby maintaining the sliding gate 108 in its open position until the respective guide member again returns to the inclined surface 116 of the cam 112.

The operation of the apparatus shown in FIGS. 5–8 is self-evident from the foregoing description. The continuous length of tubing 61 is moved downwardly under the influence of the draw rolls 11 and 13 (FIG. 1) and through the guide 62. At this point, one of the movable guide members 98 is advanced by the chain 50 to a position where the tubing 61 lies within the guide slot 106. Then, the cams 112 (FIG. 7) operate on the cam followers 114 to close the sliding gate 108, thereby retaining the tubing 61 within the passage formed by the slot 106 and gate 108.

As the individual guide members 98 are moving into operative relationship with the tubing 61, the burner assemblies 58 are doing likewise. Each of the burner assemblies emits through its outlet opening 92 a sharp, thin ribbon of flames which impinge against the tubing 61. Deflection of the tubing is prevented by virtue of its retention by the guide members 98.

Since the chain 50 and the tubing 61 move at an equal velocity, each flame will continue to be directed against a localized zone of the tubing until, after a short period of time, the tubing is severed and sealed at the localized zone. The severed and sealed sections of tubing may then be received and handled by any suitable means such as the chute and hopper disclosed in FIG. 1.

At the lower end of the vertical path of the chain 50, the tube-receiving passage in each guide member 98 is opened as the gate 108 is moved by the cam surface 120 until the flange 128 on the guide is held against the magnet 124. The gate remains in its open position until the individual guide member again is moved to a postion where the tubing is located within its guide slot 106.

It is anticipated that various portions of this invention will find utility in other environments, and with other thermoplastic materals than the glass-ceramic compounds discussed above. However, for purposes of illustration, the following example of one suitable use of the invention will be described.

Tubing of glass-ceramic material was drawn from a molten batch of 39,000–45,000 feet per hour to produce tubing having an outside and inside diameter of .020 and .018 inch, respectively. After the drawn tubing had become dimensionally stable, but retained an elevated temperature, it was passed through a chamber four feet long filled with the expanded vapors of liquid nitrogen, thereby reducing the temperature within the tubing and causing a partial vacuum which drew additional air into the tubing. The tubing was continually advanced into the severing and sealing apparatus where it was subjected to the flames of a slit-type cutting burner tip mounted on a pair of chains for 0.2 to 0.3 second. The lengths of the severed sections of tubing were 7.25 inches. Efforts were made to sever and seal sections of tubing having lengths less than 6 inches; however, the weight of the severed sections were insufficient to cause a clean separation.

In another experiment, tubing having an outside diameter of .032 inch and an inside diameter of .026 inch was drawn at a velocity of 12,000 feet per hour and subjected to continuously moving burners supported on an endless chain. The burners moved together with the tubing to heat a localized zone thereof for 0.2 to 0.3 second, and was arranged to sever sections of tubing having a length of 7.25 inches. The sections severed in this manner were found to have a clean separation.

The methods and apparatus described above are most useful in accomplishing the objectives of this invention since they permit the rapid manufacture of individual sealed sections of tubing; and, they provide for a minimization or elimination of the partial vacuum within the sealed sections of tubing.

We claim:
1. A method of producing sections of thermoplastic tubing having their opposite ends sealed, comprising the steps of
   (a) moving a length of tubing along a path, with a leading end of the tubing forwardmost,
   (b) subjecting the moving tubing to tensile forces, and
   (c) severing and sealing the tubing while under said tensile forces by heating a localized zone thereof with a burner directed against and movable with the tubing, said localized zone being spaced from the leading end a distance where the tensile forces have a magnitude sufficient to produce severing and sealing in conjunction with the burner, and
   (d) repeating step (c) at other localized zones to produce a plurality of sections of tubing having their opposite ends sealed.

2. The method of claim 1 wherein the tubing is moved longitudinally downwardly along a path having a substantial vertical component so that said tensile forces are gravitationally produced.

3. A method according to claim 1 including the steps of forming the length of tubing by drawing it from a heated body of thermoplastic material, and artificially cooling the length of tubing prior to the severing and sealing step.

4. A method according to claim 3 wherein the artificial cooling step is performed by immersing the tubing into a body of liquid.

5. A method according to claim 1 including the step of injecting a gaseous charge into the tubing, and condensing the gaseous charge before the severing step.

6. A method according to claim 5 wherein the gaseous charge includes a substance which exists in its condensed state at a normal atmospheric temperature and pressure.

7. A method of producing sections of thermoplastic tubing which have their opposite ends sealed, said method comprising the steps of
   (a) hot forming a continuous moving length of tubing having a sealed leading end while maintaining the trailing end of the tubing in communication with a source of gaseous material,
   (b) sealing and severing the length of tubing at spaced apart zones to form sealed sections of tubing which entrap said material therewithin in sufficient quantities to generate an internal pressure of at least 45 p.s.i.a. at elevated temperatures not exceeding 1500° F.

8. The method of claim 7 including the step of artificially cooling the tubing between steps (a) and (b) to create a zone of sub-atmospheric pressure which draws air inwardly through the trailing end of the tubing.

9. The method of claim 8 wherein the step of artificially cooling the tubing is performed by immersing the tub- in a liquid bath.

10. The method of claim 7 including the step of injecting a vapor of a condensible material into the trailing end of the tubing, said sealing and severing step being performed when the tubing is at a temperature below the condensation temperature of the condensible material.

11. The method of claim 7 wherein the leading end of the length of tubing is moved downwardly along a path wherein gravitational attraction creates longtudinal tensile forces therein, and the sealing and severing step is performed by heating a localized zone of the tubing with a burner directed against and movable with the tubing, said zone being located a sufficient distance above the leading end of the tubing so that gravitationally produced tensile forces attenuate the heated zone to promote severance and sealing by the burner.

12. A method of producing sections of a plurality of sealed tubings arranged in parallelism which comprises bundling where a group of the sealed tubings are laterally confined and heated to a temperature sufficient to soften the walls thereof and to create internal pressure that forces the walls of adjacent sections into mutual conformity, said method comprising the steps of
(a) cooling a length of tubing,
(b) heating a localized zone of the cooled tubing, and severing and sealing the tubing at the localized zone,
(c) repeating step (b) at different localized zones to produce a plurality of sealed sections of tubing,
(d) laterally confining a group of the sealed sections, and
(e) uniting the group of sealed sections by heating them to said temperature and expanding gases within the sealed sections thus forcing the walls of adjacent sections into mutual conformity.

13. A method according to claim 12 wherein the cooling step is performed by immersing the tubing in a body of liquid.

14. A method according to claim 12 including the initial step of drawing the length of tubing from a heated body of thermoplastic material.

15. A method of producing sections of thermoplastic tubing which have their opposite ends sealed and are suited for use in a process where a group of the sealed sections are laterally confined and heated to a temperature sufficient to soften the walls thereof and to create internal pressure that forces the walls of adjacent sections into mutual conformity, said method comprising the steps of
(a) injecting a gaseous charge into a length of hot tubing, said gaseous charge having a condensing point above normal ambient atmospheric temperature,
(b) reducing the temperature of the tubing to condense the gaseous charge,
(c) sealing and severing spaced apart localized zones of the tubing to form a plurality of sealed sections which contain the condensed gaseous charge.

References Cited
UNITED STATES PATENTS

| | | | |
|---|---|---|---|
| 3,315,740 | 4/1967 | Withers | 156—296 X |
| 3,580,764 | 5/1971 | Gerlach et al. | 156—296 |

CARL D. QUARFORTH, Primary Examiner

S. J. LECHERT, Jr., Assistant Examiner

U.S. Cl. X.R.

156—146, 156, 165, 198, 229, 244, 251, 264, 285, 296, 306